US012539998B2

(12) United States Patent
Olsen et al.

(10) Patent No.: US 12,539,998 B2
(45) Date of Patent: Feb. 3, 2026

(54) DISINFECTION METHOD FOR PLASTIC DEVICES

(71) Applicant: PLASTSERVICE AS, Myre (NO)

(72) Inventors: Dan Roger Olsen, Myre (NO); Kjell D. Josefsen, Trondheim (NO); Karsten Husby, Trondheim (NO); Leif Grimsmo, Jakobsli (NO)

(73) Assignee: PLASTSERVICE AS, Myre (NO)

( * ) Notice: Subject to any disclaimer, the term of this patent is extended or adjusted under 35 U.S.C. 154(b) by 869 days.

(21) Appl. No.: 16/770,542

(22) PCT Filed: Dec. 6, 2018

(86) PCT No.: PCT/NO2018/050305
§ 371 (c)(1),
(2) Date: Sep. 25, 2020

(87) PCT Pub. No.: WO2019/112443
PCT Pub. Date: Jun. 13, 2019

(65) Prior Publication Data
US 2021/0009296 A1    Jan. 14, 2021

(30) Foreign Application Priority Data

Dec. 6, 2017  (NO) .................................... 20171946
Oct. 29, 2018  (NO) .................................... 20181390

(51) Int. Cl.
*B08B 7/00* (2006.01)
*A61L 2/12* (2006.01)
*A61L 2/18* (2006.01)
*B65B 55/24* (2006.01)
*B65G 15/30* (2006.01)

(52) U.S. Cl.
CPC ............... *B65B 55/24* (2013.01); *A61L 2/12* (2013.01); *A61L 2/18* (2013.01); *B08B 7/0035* (2013.01); *B65G 15/30* (2013.01); *A61L 2202/11* (2013.01); *A61L 2202/15* (2013.01); *A61L 2202/17* (2013.01); *A61L 2202/23* (2013.01); *B65B 2210/06* (2013.01)

(58) Field of Classification Search
CPC .... A61L 2/12; A61L 2202/15; A61L 2202/23; B65B 2210/06; B65B 55/24
See application file for complete search history.

(56) References Cited

U.S. PATENT DOCUMENTS

| 3,256,101 | A |   | 6/1966 | Arns |   |
|---|---|---|---|---|---|
| 3,753,651 | A |   | 8/1973 | Boucher |   |
| 5,098,665 | A | * | 3/1992 | Katschnig | ................ H05B 6/80 |
|   |   |   |   |   | 219/757 |
| 6,521,178 | B1 |   | 2/2003 | Goldstein et al. |   |
| 2008/0067078 | A1 | * | 3/2008 | Kitaori | .................. A61L 2/0088 |
|   |   |   |   |   | 204/252 |
| 2014/0020331 | A1 |   | 1/2014 | Chin et al. |   |
| 2015/0329225 | A1 | * | 11/2015 | Moncayo, Jr. | ............ A61L 2/07 |
|   |   |   |   |   | 422/26 |
| 2017/0246330 | A1 | * | 8/2017 | Lyon | ......................... A61L 2/28 |

FOREIGN PATENT DOCUMENTS

| CA |   | 2293651 | A1 | * | 12/1998 | ............... A61L 9/01 |
|---|---|---|---|---|---|---|
| CN |   | 105903055 | A | * | 8/2016 |   |
| EP |   | 3199462 | A1 | * | 8/2017 | ............... A61L 2/14 |
| KR |   | 20110035322 | A | * | 4/2011 |   |
| WO | WO | 98/50175 | A1 |   | 11/1998 |   |
| WO | WO | 99/03512 | A2 |   | 1/1999 |   |
| WO | WO | 99/25802 | A1 |   | 5/1999 |   |
| WO | WO | 99/56793 | A1 |   | 11/1999 |   |
| WO |   | WO-2016138000 | A1 | * | 9/2016 | ............... A47J 31/44 |
| WO |   | WO-2016193943 | A1 | * | 12/2016 |   |
| WO |   | WO-2017021735 | A1 | * | 2/2017 | ............... A23L 3/01 |
| WO | WO | 2017/053668 | A1 |   | 3/2017 |   |

OTHER PUBLICATIONS

KR 20110035322 A Translation.*
CN-105903055-A Translation.*
Nyhetsoppslag på Avmor.com: "Bin cleaning", publisert 2017.06.14 (transkripsjon av TV-innslag Jun. 24, 2014) [Hentet May 28, 2019 fra internett] (https://www.avmor.com/misc/bin-cleaning/) Avsnittet "What FMs and BSCs Need to Do".
Search Report issued in NO application No. 20171946, dated Jun. 8, 2018.
International Search Report issued in application No. PCT/NO2018/050305, dated Feb. 15, 2019.
Search Report issued in NO application No. 20181390, dated May 28, 2019.

(Continued)

*Primary Examiner* — Elizabeth A Robinson
*Assistant Examiner* — Changru Chen
(74) *Attorney, Agent, or Firm* — Birch, Stewart, Kolasch & Birch, LLP

(57) ABSTRACT

Cleaning and disinfection of multi-use plastic materials used in the food industry can be accomplished by using microwave radiation in combination with an electrolyte solution, thereby achieving at least 99.99% killing of microorganisms present on and inside the plastic device. Cleaning and disinfection of plastic trays used in security check screening can also be accomplished using microwave radiation in combination with an aqueous solution, thereby achieving at least 99.9% killing of pathogenic microorganisms present on the plastic tray.

14 Claims, No Drawings

(56) References Cited

OTHER PUBLICATIONS

Jensen, "Dann-Roger found murder weapons against bacteria", Bladet Vesterålen, Jun. 11, 2018, pp. 1-23, with partial English translation.
Johansen, "Ant company receives 2.6 mill", Bladet Vesterålen, Dec. 11, 2014, pp. 1-14, with partial English translation.
Lindebø, "Øksnesbedrift receives research support, Plastservice AS will research the fight against bacteria", Monter, Dec. 11, 2014, pp. 1-5.
Redaksjonen, "Listeria bacteria in plastic containers", IntraFish Media, Dec. 5, 2013, pp. 1-2.
Supplementary European Search Report for European Application No. 18885747, dated Jul. 12, 2021.

* cited by examiner

DISINFECTION METHOD FOR PLASTIC DEVICES

TECHNICAL FIELD

The present invention relates to cleaning and disinfection of multiuse plastic materials used in food industry by using microwave radiation. More specifically the invention relates to disinfection of load carriers, containers and other devices made of plastic materials used in processing and transport of perishable foodstuff, such as raw fish, seafood and meat, by using microwave radiation. The invention also relates to disinfection of parts made of plastic materials in conveyor belt used in food industry, by using microwave radiation. Furthermore, the present invention relates to cleaning and disinfection of plastic security trays used in security check screening.

BACKGROUND

Globally, the world is facing a challenge when it comes to spreading of diseases. People's travel habits can make pathogenic substances such as virus and bacteria spread throughout the world within a short period of time, and in worst case become a pandemic. In addition, pathogenic bacteria and microorganisms may be spread via equipment used in food processing industry and transportation, both locally and globally. The present patent application relates to a method of mitigating the risk of spreading diseases and pathogenic bacteria via plastic equipment used in food processing industry and transportation, and plastic trays used in security check screening gates.

At security checkpoints personal belongings are placed in plastic trays for security screening. The same plastic trays are handled multiple times by multiple people and are exposed to a wide range of microorganisms. Investigations have shown that plastic trays at airport security may carry a large number of germs, such as viruses, bacteria, fungus, parasites, which can be transferred to passengers and staff. This may become a health threat, especially at airport security checks where people from different regions and parts of the world may become infected via such trays and spread pathogenic viruses and bacteria globally in a short time.

Cleaning and disinfecting normally involves using sanitizing and disinfecting chemicals. The usage and application of such disinfectants need to be according to prescribed instructions and/or routines in order to achieve desired removal of harmful microorganisms. The surface of plastic materials is easily damaged during handling and use, e.g. formation of scratches, holes, notches, chipping and general wearing. In damaged areas humidity may be entrapped creating favorable conditions for growth of microorganisms, and such damaged areas in the surface of a plastic tray may not be sufficiently cleaned by normal sanitizing routines. Further, it is an increasing problem that microorganisms develop resistance to disinfectants. Other potential problems that may be encountered are associated with the fact that some chemicals may be suitable for sanitizing and/or disinfecting certain microbes while not being effective towards other microbes. Therefore, usage of chemicals to sanitize and disinfect plastic trays may involve a risk that the surfaces are inadequately cleaned, hence harmful pathogenic microorganisms may remain on the surface of the plastic trays. In addition to the risk of inadequate cleaning and disinfecting there is, of environmental considerations, a desire to reduce the usage of chemicals. The usage of chemicals may also have a negative impact on working environments where exposure to chemicals is frequent.

Some security trays are treated with antimicrobial agent, incorporated in the tray, making microorganisms unable to function, grow and reproduce. There is however a desire to reduce the usage of antimicrobial agents, as such agent may contribute to the development of resistant bacteria. There is also a risk that microorganisms can find shelter against antimicrobial agents in small invisible damages in the security trays.

There is therefore a need for a non-destructive method to disinfect plastic trays used for screening at security checkpoints. There is a need for a simple, effective and reliable method of cleaning and disinfecting plastic trays used at security checkpoints which removes pathogenic microorganisms, including viruses, bacteria, fungi, parasites, etc. There is also a desire that such method can be accomplished without usage of strong disinfectant and chemicals, both for environmental reasons and for the work environment.

Cleaning and disinfecting devices exposed to food products in the food industry, also normally involves using sanitizing and disinfecting chemicals. There is a plurality of disinfecting and/or sanitizing chemicals that are commonly used in the food industry. The usage and application of such chemicals need to be according to prescribed instructions and/or routines, in order to achieve the desired results and efficiency. However, it is an increasing problem that microorganisms develop resistance to disinfectants, and food producers must adjust the strength of the chemicals as the microorganisms develop resistance towards normal treatment. In addition, there may be regulations as to how much residues of sanitizing and disinfecting products are allowable on the surfaces of such devices. Other potential problems that may be encountered are associated with the fact that some chemicals may be suitable for sanitizing and/or disinfecting certain microbes while not being effective towards other microbes. Therefore the usage of chemicals to sanitize and disinfect may be complicated and there is a risk that the surfaces are inadequately cleaned, hence harmful microbes and bacteria may remain or develop, and in worst case develop resistance to the chemicals. In addition to the risk of inadequate cleaning and disinfecting there is, of environmental considerations, a desire to reduce the usage of chemicals. In addition, reducing the usage of chemicals may have a large impact on working environments where exposure to chemicals is frequent.

Other methods for sanitizing and disinfecting of devices which come into contact with food in the food industry may involve the usage of steam. However, disinfection with steam may be difficult to monitor and thus to verify, and for larger installations, the usage of steam may be impractical, energy demanding and time consuming.

Some methods for disinfecting and sterilizing involve the usage of heat, e.g. heating by microwave radiation. The usage of microwave radiation is e.g. known for sanitizing dental equipment, ref. WO 99/56794. The equipment can be sanitized by using a detergent solution or treating composition, and subjecting both the equipment and composition to microwave. WO 99/56794 discloses that surfaces and articles of different material types, which are capable of being immersed into a detergent solution inside a microwave oven, can be used in the method. WO 99/25802 discloses a method for cleaning using microwaves and a bleaching composition. The method is disclosed for removing stains and/or odors and for disinfecting plastics and other surfaces by contacting a substrate containing a liquid or a gel treating composition with the surface and subjecting it to microwaves. US 2014/0020331 disclose a method and microwave sterilization device for sterilizing containers in the food and beverage packing process made of paper, glass, pottery, porcelain, wood or plastic material. The method involves the use of a germicide like hydrogen peroxide, peracetic acid, hypochlorite or sodium hypochlorite. WO 2011/038799 discloses a method and an apparatus for sterilizing surfaces, especially surfaces of packaging material. According to WO 2011/038799, short-wave electromagnetic radiation impinges on the surface to be disinfected, said radiation being guided from the source of radiation to the surface by a transmission medium that is adjusted to the radiation. The packaging material may be for foodstuffs, such as cans, bottles, cups or the like. The cleaning and sanitizing methods disclosed in above referred prior art have the limitation that the methods use harmful chemicals and may only be employed for relatively small items, i.e. having a small surface area, or articles that may be immersed in treatment solutions. Moving to methods for disinfection of large constructions it is important to develop a method that is efficient but still reliable when it comes to sanitizing and disinfecting large surfaces made of plastic materials. The method should also be environmental friendly preventing the use of excessive amounts of corrosive chemicals that demands extra protective equipment and protective gear.

Plastic materials are extensively used in the food industry, for instance during the processing and handling of food products, transport and shipment. Plastic materials are the most common packaging material for the end user market; however, these are often single use packages and discarded after use. On the other side, plastic materials used in the processing and transport of food products in the food industry, such as conveyor belts, containers, pallets and other plastic devices, are normally used several times. Such multiuse devices made of plastic materials whose surfaces repeatedly come into contact with new food products are subjected to strict hygiene control, which is critical to avoid growth of microorganisms, such as bacteria and fungi, and even organisms such as maggots. If the hygiene is inadequate, remaining microorganisms may be transferred to food products that come into contact with the surface of the plastic materials. Hygiene control is extremely important in food processing plants and in transport of perishable raw food products such as fish, seafood and meat, as these food products are especially susceptible to development of pathogenic bacteria. Export of certain food products, like raw fish and seafood products from some parts of the world, may be combined with return transport of e.g. fruit and vegetables using the same transport containers. The containers used for such transport must therefore be sanitized and disinfected after each usage to avoid bacterial growth, especially growth of pathogenic bacteria, and the risk of cross-contamination of the food products contained therein.

Containers and equipment used for handling and transport of food products, especially unprocessed or semi-processed food like fish, seafood and meat, are conventionally made of plastic material, generally denoted load carriers. Load carriers may be large plastic containers, often made with double walls to provide sufficient rigidity and strength to be handled and stacked on top of each other. Containers may also be made with single walls having areas, e.g. corners, bottom, etc., with double walls for strengthening purpose. The space between the double walls may be filled with air or a foam material. Large load carriers are normally handled by forklift trucks, and the load carriers are frequently damaged during handling and transport, e.g. puncture of the walls, creation of notches and crevices in the surface. During handling of load carriers cracks may form, e.g. due to twisting/torsion, which may not be visible as the crack may appear to be closed when the container is not loaded. However, in any such damaged area it is very likely that liquid has collected and, hence, a risk of microorganism growth is high. Plastic materials are generally prone to bacterial growth as cuts and scratches in the surface may easily form, and in which humidity may be entrapped creating favorable conditions for growth of microorganisms and biofilms. In load carriers water may accumulate in damaged areas, e.g. between double walls, and since such entrapped water usually will contain biological substances, there is a high risk of growth of microbes in such locations and collected water. In the event of leakage of such entrapped water containing microorganisms, food products contained in the load carrier will probably become infected. A load carrier having a puncture may thus become a source of infection since the containers normally are used in several steps in a production facility. Damaged load carriers should therefore be disinfected and repaired before further usage to avoid such risk. Similar challenges are also present with the usage of plastic pallets, plastic boxes, plastic trays and any other plastic equipment used in the food processing industry. During handling and use of such plastic devices, the surface may be damaged by scratches, holes, notches, chipping and general wearing. If chips are formed on plastic surfaces, e.g. by usage of knifes, there is a risk that such chips may be "glued" to the surface by liquids from the food products (e.g. fatty liquids in salmon processing facility), thereby creating a growth zone for microorganisms, or formation of biofilms. Today there is no effective and reliable method for disinfection of such large, or relatively large, multiuse devices made of plastic materials, for use in the food industry. And especially not for disinfecting damaged surfaces of multiuse plastic devices used in the food industry and hollow space between double walls of load carriers or the like, in which harmful vegetative microorganisms may grow.

In a food production facility, conveyor belts can be hundreds of meters and even kilometers long. Such transport belts must frequently and routinely be dismantled for sanitizing. The normal procedures involves immersing the plates, and any parts of the conveyor band that come into contact with food products, in strong detergent for a prescribed time (may be hours), followed by scrubbing with brushes and rinsing with water. The plastic parts of the conveyor band may, similarly as described above, have damages in the surface, in which humidity may be entrapped creating favorable conditions for growth of microorganisms, and formation of biofilms. Therefore, traditional sanitizing routine is often insufficient for removing all microorganisms, e.g. pathogenic bacteria, and remaining bacteria are frequently detected when the conveyor band has been mounted again. Today there is no satisfactory method for eliminating this problem, and to disinfect plastic conveyor band in an efficient, safe and reliable way. It is also desired to substantially reduce the time for disinfecting such plastic conveyor bands, as production standstill is very costly for food production enterprises.

Thus, there is also a need for a non-destructive method to sanitize and disinfect multiuse plastic devices used in the food industry that come into contact with food products, especially multiuse plastic devices that have damages in the surface wherein humidity may be entrapped creating favorable conditions for growth of microorganisms. More specifically, there is a need for a method to sanitize and disinfect containers made of plastic material, such as load carriers, used during handling, storage and transport of food products in the food industry. Even more specifically, there is need for a reliable and efficient method for disinfection of the hollow space between double walls of load carriers and any other double walled plastic devices used in the food industry. There is also a need for a simple, efficient and reliable method for sanitizing and disinfecting conveyor belts parts made of plastic materials. Furthermore, there is a need for an environmental friendly, simple and reliable method to sanitize and disinfect large structures made of plastic materials without the use of excessive amounts of corrosive chemicals that demands extra protective equipment and protective gear, and that may be harmful to the environment. It is also a desire that the disinfection method is "green", i.e. that usage of strong chemicals should be reduces and may even be fully avoided.

The object of the present invention is therefore to provide a method for disinfecting plastic trays which alleviates at least some of the shortcomings of the current practice. Another object of the present invention is to provide a method for disinfecting large multiuse plastic devices used in the food industry, which alleviates at least some of the shortcomings of the current practice.

It is well known that microorganisms can be killed by heat treatment and that this heating can also be achieved by means of microwaves (Datta & Davidson, 2000), as also shown in several patents, e.g. U.S. Pat. No. 9,125,958 B2 and U.S. Pat. No. 6,039,921 A). The challenge with disinfection of multiuse plastic devises used in the food industry, e.g. load carriers, by using microwave heating is the size, the highly inhomogeneous distribution of the microorganisms (which are primarily located in small water bodies in damaged areas) and the requirement for rapid treatment (a few minutes) inter alia for logistical reasons. While achieving effective killing of the microorganisms in a short period of time, it must be avoided that heating causes overheating of sensitive areas in the plastic items and, that at worst, melts or destroys. Another challenge is the presence of a plurality of small droplets (volume less than 100 µl), which may also contain bacteria. When the volume of the liquid is very small, the heat loss to the cooler plastic surface will increase. The heating is thus slower, and at the same time the droplets may evaporate completely before the temperature becomes high enough to kill the bacteria.

The present inventors found that by usage of an electrolyte solution in combination with microwave radiation it is possible to efficiently disinfect multiuse plastic devices used in the food industry. Tests show that by usage of an electrolyte solution in combination with microwave radiation, it is possible to efficiently disinfect large load carriers made of plastic material on both the inside, the outside of the load carriers as well as the hollow part between the inner and outer wall, achieving at least 99.99% reduction of the number of vegetative cells (primarily bacteria) within a treatment time of less than 5 minutes, and without increased usage of chemicals. It was surprisingly found that disinfection where at least 99.99% reduction of the number of vegetative cells (primarily bacteria) on the plastic devices can be obtained without usage of any strong sanitizing/disinfecting chemicals traditionally used in the food industry. The present inventors also found that the treatment method can be employed achieving the same result, i.e. at least 99.99% reduction of the number of vegetative cells (primarily bacteria) within a treatment time of less than 5 minutes, to disinfect plastic parts of conveyor belts.

The method for disinfecting by the usage of an electrolyte solution in combination with microwave radiation is fast and reliable, and ensures that load carriers, and other multiuse plastic devices, that comes into contact with food products in the food industry, may not become a source of spreading pathogenic microorganisms in the food industry in general. The method according to the present invention also considerably reduces, and may even eliminate, the usage of strong sanitizing and/or disinfecting agents and chemicals, which is an important advantage since it is an increasing problem that microorganisms develop resistance to disinfectants and antiseptic agents. Since the problem of resistance is expected to increase in the future it is extremely important to develop disinfection methods that reduces and even avoids the usage of such disinfecting chemicals. Attention is also directed to avoid spreading of resistant bacteria and microorganisms, which may be a risk when using the same transport devices in export/import of food products. The method for disinfecting by the usage of microwave radiation, according to the present invention, involves a relatively short treatment time in a microwave oven, thus overheating and hot spots in the plastic material are avoided.

Short treatment time is also important for logistic reasons. In addition, the reliable method to disinfect multiuse plastic devices means that such plastic devices may be in use for a much longer time, which is a big advantage, especially for environmental reasons. These and other advantages of the present invention will become evident in the following description of the method.

SUMMARY OF INVENTION

The present inventors found that the objects can be met by a method comprising wetting the plastic trays or multiuse plastic devices with an aqueous solution comprising electrolytes, followed by treating the thus wetted plastic tray by microwave radiation.

In a first aspect the present invention provides a method for disinfecting a multiuse plastic device used in food industry, in which harmful vegetative microorganisms may grow, where the method comprises contacting and/or washing the plastic device with an electrolyte solution comprising one or more of (a) dissolved salt and/or (b) an alkali or an acid; and thereafter transferring the thus wetted plastic device into a microwave oven treatment chamber, in which the plastic device is subjected to microwave radiation treatment in a sufficient time to eliminate essentially all vegetative microorganisms present on the plastic device.

In an embodiment, at least 99.99% of all vegetative microorganisms are killed during the disinfecting treatment of the multiuse plastic devise.

In an embodiment of the method the electrolyte solution further comprises (c) a bubble forming agent. The bubble forming agent may be a soap approved for use in food industry.

In an embodiment of the method the microwave radiation treatment time is less than about 7 minutes.

In an embodiment of the method the microwave treatment is from about 30 seconds to about 5 minutes. The microwave treatment may be from about 1 minute to 3 minutes.

In an embodiment of the method the electrolyte solution is formed by at least one dissolved salt selected from the group; NaCl, KCl, $Na_2SO_4$, $MgCl_2$, $Na_2HPO_4$, $NaH_2PO_4$, $K_2HPO_4$, $KH_2PO_4$ or seawater, or a mixture thereof.

In an embodiment of the method the amount of dissolved salt(s) is from about 5 g/L to about 50 g/L.

In an embodiment of the method the alkali is NaOH and/or KOH.

In an embodiment of the method the acid is HCl or $H_3PO_4$.

In an embodiment of the method the electrolyte solution is contacted the plastic device by spraying, brushing, pressure washer or immersing. The electrolyte solution may be used for washing the multiuse plastic device, optionally followed by rinsing with clean or sea water.

In an embodiment of the method the microwave radiation treatment is performed in a microwave oven which has a uniform electromagnetic radiation throughout the treatment chamber. The microwave oven may have a treatment chamber in the form of a rectangular box, or a hexagonal box. The microwave oven may have a plurality of magnetrons, ensuring homogenous microwave radiation throughout the treatment chamber.

In an embodiment of the method the multiuse plastic device include large load carriers, containers, pallets, boxes, trays, shovels, and conveyor belts.

In an embodiment of the method the disinfection of the conveyor belt comprises demounting of the belt, washing the conveyor belt parts with the electrolyte solution, placing the wet conveyor belt parts in a plastic container and transferring the container, containing the conveyor belt parts, into the microwave oven for microwave radiation treatment.

In an embodiment of the method any entrapped water in the multiuse plastic device is removed before the washing and disinfecting treatment.

In an embodiment of the method the multiuse plastic devices have damages in the surface or internal parts. The damaged surface or internal parts are not sanitized by conventional washing, and thus exposed to growth of microorganisms.

In an embodiment of the method the disinfection method does not require any disinfectants or harmful chemicals. The method for disinfecting the multiuse plastic devices uses an electrolytic solution comprising food compatible dissolved salt and/or food compatible dilute base or acid, optionally food industry approved soap. In an embodiment of the method suitable treatment time and microwave intensity, and possibly position in the treatment chamber, for different standard items are recorded, thereby enables treatment of the said devices in a reliable and efficient way. In a further embodiment the washing process and microwave treatment process are automated, possibly by the use of recorded treatment times and intensities.

In a second aspect, the present invention provides a method for disinfecting a plastic tray used in security check screening, the method comprises contacting the plastic tray with an aqueous solution; transferring the thus wetted plastic tray into a microwave treatment chamber, in which chamber the plastic tray is subjected to microwave radiation in a sufficient time to kill at least 99.9% of pathogenic microorganisms present on the plastic tray.

By the present method according to the second aspect it is possible to achieve a killing rate of pathogenic microorganisms on the plastic tray of at least 99.9%, and even a killing rate of at least 99.99%, within a treatment time of less than 30 seconds, and without increased usage of chemicals.

In an embodiment, at least 99.99% of pathogenic microorganisms present on the plastic tray are killed during the disinfecting treatment.

In an embodiment the microwave radiation treatment time is less than 30 seconds.

In an embodiment the microwave treatment is from 7 seconds to 20 seconds.

In an embodiment the aqueous solution comprises one or more of (a) dissolved salt and/or (b) a dilute alkali or a dilute acid.

In an embodiment the dissolved salt is selected from the group; NaCl, KCl, $Na_2SO_4$, $MgCl_2$, $Na_2HPO_4$, $NaH_2PO_4$, $K_2HPO_4$, $KH_2PO_4$, or a mixture thereof.

In an embodiment the amount of dissolved salt(s) is from about 5 g/L to about 50 g/L.

In an embodiment the alkali is NaOH, KOH, or a mixture thereof.

In an embodiment the acid is HCl and/or $H_3PO_4$.

In an embodiment the aqueous solution comprises (c) a foaming agent.

In an embodiment the aqueous solution is contacted the plastic tray by spraying, brushing, rinsing, pressure washing or immersing.

In an embodiment, the method comprises transporting the plastic tray on a conveyor line through a first zone, wherein the plastic tray is wetted with the aqueous solution; followed by transporting the thus wetted plastic tray on the conveyor line through a second zone comprising a microwave treatment chamber, wherein the wetted plastic tray is subjected to the microwave treatment.

In an embodiment the microwave radiation treatment is performed in a microwave treatment chamber having a uniform microwave radiation throughout the treatment chamber. The microwave oven may have a plurality of magnetrons, and/or stirrers, ensuring homogenous microwave radiation throughout the treatment chamber.

In an embodiment the microwave radiation is formed by 6-36 magnetrons, each having an effect of 0.5-5 kW.

In an embodiment the microwave treatment chamber is in the form of a rectangular box, a hexagonal box or a pentagonal box, provided with gate(s) in one or both end(s).

DETAILED DESCRIPTION OF THE PREFERRED EMBODIMENT

The method according to the first aspect of the invention is of significance to food industry and particularly to the seafood industry that transport fresh seafood and meat product in large load carriers. The load carriers are made of plastic, due to rough handling are prone to damage, and consequently risk of growth of pathogen bacteria in the damaged areas. The method of the invention is also significant to the food industry where the surfaces of conveyor belts come directly into contact with food product. Such surfaces of conveyor belts are commonly made of plastic material, and hence subjected to the risk of growth of pathogen bacteria in damaged areas, and/or in areas of hinged couplings/links of modular transport belts.

The present method of disinfecting multiuse plastic devices used in food industry essentially includes the steps of contacting the plastic devices with a solution comprising least an electrolyte (ions) and transferring the thus wetted plastic device into a microwave generator in which the plastic device is subjected to microwave radiation treatment for a sufficient time to eliminate essentially all vegetative microorganisms present on and inside the plastic device. The present invention utilizes the fact that moist heat kills microorganisms more effectively than dry heat. In addition, microwaves especially heat water and humid environment, therefore the energy supplied is converted to heat in locations where most of the microorganisms are present. As microwaves penetrate through plastic material, without significantly heating the plastic material, water or liquid containing areas and cavities inside the plastic device will also be rapidly heated, so that any potential pathogenic bacteria are killed. The ions in the electrolyte solution increases the heating rate significantly, therefore even small droplets will be heated fast enough to kill the bacteria before they evaporate. In addition, the number of bacteria being killed increases due to increasing osmolarity of the electrolyte solution as the water is evaporating. The electrolyte solution may also comprise a foaming agent which aids the disinfection process by bubble formation during the microwave treatment, thus moving the heated electrolyte solution to colder areas, and thereby increasing the areas being treated, including any hollow space between two walls in damaged areas if present.

It should be understood that by "disinfecting" in this context, it is meant a method that removes essentially all nucleating vegetative cells initially present on and in the plastic device. By "essentially all", it is meant by at least 99.99% of nucleating vegetative cells initially present on and in the plastic device.

The term "vegetative cells" as employed herein denote any bacterium or unicellular alga that is actively growing or forming spores. Including but not limiting to *Bacillus cereus* (gram-positive bacteria), *Clostridium perfringens* (gram-positive bacteria), *C. botulinum* (gram-positive bacteria), *Listeria monocytogenes* (facultative anaerobic bacteria), *Escherichia coli* (gram-negative bacteria), *Salmonella* spp. (gram-negative bacteria), and *Vibrio parahaemolyticus* (gram-negative bacteria).

In the present context the term "multiuse plastic device" should be understood to denote any multiuse plastic equipment used in the food industry, which are subjected to strict hygiene requirements. The term "multiuse plastic device" should be understood to denote any multiuse plastic equipment used in the food industry, which are normally used several times, and whose surfaces repeatedly come into contact with new food products. Such plastic devices include large load carriers, containers, pallets, boxes, trays, shovels, conveyor belts and other plastic equipment used in the food industry for handling, transporting and temporary storing of food products, semi-finished or finished food products. Some of the plastic devices are only used internally within the production facility, while other, especially plastic load carriers, containers and pallets, may be used for transport between a receiving facility and a food processing facility, and possibly also the end market. Load carriers or containers may be designed to fit on standard European or International size, e.g. standard European sizes 1200×800 mm, 800×600 mm pallets as well as standard 1200×1000 mm pallets. Other common sizes within manufacturing and shipping are 600×400 mm and 400×300 mm, which fit and can easily be stacked on a pallet measuring 1200×800 mm Inner volumes of load carriers or containers varies from typically 8-10 L to 2000 L. In the present context, the term "conveyor belt" or "transport belt" should be understood to denote conventional conveyor belts of different lengths, widths and designs used in the food processing industry, including hinged modular belts. Relevant in this context are conveyor belts of plastic materials. The multiuse plastic devices for the food industry are typically made of polyethylene of different density, generally known in the art. There are several densities of polyethylene, e.g. high density (HDPE), medium density (MDPE), low density (LDPE) and very low density (VLDPE). The polyethylene products are conventionally produced by rotational moulding techniques, injection molding or extruding. The multiuse plastic devices may also comprise other materials such as polyurethane. Thus the present invention is especially suitable for plastic devices made of polyethylene and/or polyurethane, although not limited to said plastic materials.

In the present context "large" should be understood as denoting load carriers and plastic devices including the above dimensions. "Large" should also be understood to include load carriers and containers with inner volumes from about 8 L to about 2000 L. Plastic conveyor belt parts, that comes into contact with food products and therefore frequently need to be sanitized and disinfected may have various dimensions and forms, however due to the large number of parts such conveyor belt parts are considered to be large items in the present context. It should be noted that the load carriers and other plastic devices used in the food industry, which can be treated according to the present invention application, may have other dimensions than specified above.

The present invention will be explained by disinfection of load carriers of the type large plastic containers of 500-1000 liters, where the plastic containers have double walls. Such containers are extensively used in the seafood industry as well as other food product industries (e.g. meat, chicken). In order for the plastic containers to have the sufficient strength when stacked above each other when they are filled with fish or other food products, the containers are normally produced with double walls where the distance between the inner and outer wall is typically 2-3 cm. The space between the walls is filled with air or an isolating material such as polyurethane, which also provides extra stability and strength. The containers are made of polyethylene which is acid, alkali and corrosion resistant. Said materials (polyethylene and polyurethane) are heated by microwave radiation, but much slower than water and water containing accumulations, such as residues of fish, food, etc. Microwave treatment of such large items might in a worst case scenario cause parts of the load carrier overheat and melt or ignite. This puts a limit to the time and intensity of the microwave treatment, while at the same time the aim of a destroying/killing rate of vegetative microorganisms in and on the load carrier of least 99.99% should be obtained.

Before the disinfecting treatment of the load carrier, the container should be washed in order to remove stains, dried residues, etc. If the container has larger damages, such as punctures, any contained dirty water should be emptied from hollow spaces before the cleaning. The cleaning may be performed according to normal procedures using wash water, scrubbing and rinsing. The washing may be performed by manual methods using brushes and/or pressure washer or by automatic methods. In an automatic method, e.g. an industrial washing machine, washing may be performed by spraying washing solution by means of nozzles, followed by rinsing with water. The washing may be performed by using conventional cleaning agents approved for use in the food industry, in amounts (concentration of cleaning agent in wash water) recommended by the producer of the cleaning agents. Advantageously the washing is performed by using a washing solution containing electrolytes (ions of salts) and/or alkali (e.g. caustic soda or caustic potash) and/or acid (e.g. hydrochloric acid or phosphorus acid). The washing solution may also comprise a foaming agent (e.g. soap approved for use in food industry), especially if the plastic device are dirty and have solidified layers of food remnants. By washing with the said washing solution comprising electrolytes and optionally a bubble forming agent, a wet film is left on the plastic device, and in damaged areas (holes, scratches, etc.). This wet film contains remains of the electrolyte solution in an amount optimal for the microwave treatment, and the wet plastic devices may thus be directly transferred to the microwave oven for microwave treatment.

The electrolyte solution (wash water) employed herein is an aqueous solution comprising a dissolved salt and/or an alkali or an acid. Examples of suitable salt are NaCl, KCl, $Na_2SO_4$, $MgCl_2$, $Na_2HPO_4$, $NaH_2PO_4$, $K_2HPO_4$, $KH_2PO_4$ or seawater, or a mixture thereof. Said salts are food compatible and any salt left behind on the plastic device after evaporation may even prevent new bacterial growth. Suitable alkalis are NaOH and KOH which are also food compatible. The concentration of dissolved salt in water, forming the electrolyte solution, may be from about 0.5% to about 5.0% (5 g/L to 50 g/L). Tests showed that effective killing of microorganisms, and increased heating rate, was achieved with a salinity of about 1%. The salinity of seawater is about 3.5%. Thus, suitable salinity in the electrolyte solution may be from about 1% to 3.5% (10 g/L to 35 g/L).

Alkali (bases) may kill microorganisms in itself, however if alkali is present in the electrolyte solution, it should be in a very dilute form. During the microwave treatment, as water evaporates, the concentration of the alkali increases, thereby the killing effect of microorganisms increases. Concentration of alkali in the electrolyte solution may be from about 0.1% to about 2% (in water). The inventors found that effective killing of microorganisms and a fast heating rate during microwave treatment was achieved with concentration of alkali between about 0.4% and about 1.5% in the electrolyte solution. It is however desired to reduce the usage of chemicals, therefore the concentration of alkali should advantageously be in the lower area, e.g. about 0.2% to about 0.5%.

Instead of an alkali, an acid may be used. Suitable acids are e.g. hydrochloric acid (HCl) and phosphorus acid ($H_3PO_4$), which are food compatible. Correspondingly as the alkali, acid may kill microorganisms in itself. If acid is present in the electrolyte solution, it should be in a very dilute form, thus during the microwave treatment as the water evaporates the concentration increases which increases the microorganism killing effect. Concentration of acid in the water, forming the electrolyte solution, should be from about 0.1% to about 2%, e.g. from about 0.4% to about 1.5%. Due to the desire of reduced usage of chemicals, the concentration of acid should be about 0.2% to about 0.5%. Also as the water evaporates the concentration of the alkali (e.g. caustic soda) or acid increases to a level that leads to killing of bacteria, which may be important in very small droplets.

The electrolyte solution may also comprise foaming agents, i.e. bubble forming substance. Such foaming agent may be any soap approved for use in the food industry. The amount of said foaming agent can be according to recommended amounts indicated by the soap producer. Advantageously the amount of foaming agent is in the lower recommended range, as layers of soap may remain on the plastic surface after disinfection. Such remaining soap products should be rinsed off before reusing a plastic device for food product. Presence of a bubble forming agent in the electrolyte solution is on the other side positive during the disinfecting treatment in the microwave oven, since bubbles are produced during the microwave treatment as the water starts boiling. The bubbles expand the volume of remaining wash solution preset especially in damaged places, such as hollow areas and in scratches, so that heat is moved over larger areas.

The electrolyte solution suitable for washing and microwave treatment is a diluted solution, and does not contain any strong sanitizing and/or disinfecting chemicals that require additional precautions regarding handling, storage of use beyond normal protective equipment for industrial washing procedures, such as gloves and eye protection. The present electrolyte solution does not contain harmful substances, such as oxidizing chemicals or disinfectants, which may put the workers and/or the environment at risk.

After washing and rinsing the damaged plastic devise, e.g. a load carrier, including drainage of any entrapped liquid in hollow spaces, the load carrier is treated by microwave radiation. As indicated above, the load carrier should be wet after the washing, containing a film of the electrolyte solution, especially at damaged areas in the surface and/or any hollow parts, before the treatment in the microwave oven. The wet load carrier is thus subjected to microwave radiation for a sufficient amount of time to disinfect all parts of the surface and internal parts of the load carrier. Microwaves kill microorganisms by heating in the same way as conventional heat treatment. The rate of killing is a function of time and temperature. The difference is that by using microwave radiation, the heating occurs much faster and primarily in the water phase, both on the outside and the inside of the device, compared to conventional heating means. Total energy consumption is therefore significantly lower than for conventional heating. There is, however, a risk that when using microwaves for heating, large temperature gradients over relatively short distances may be created, and microorganisms can survive in cold and dry spots in the load carriers. Consequently, quick heating rate and uniform distribution of microwaves for sufficient heating is important to achieve satisfactory results. This implies the recommended method to disinfect wet load carriers right after washing and by using a microwave system that provides a homogenous microwave field.

The microwave-heated systems for performing the present disinfecting method should generate a homogeneous microwave field. By a homogenous microwave field, it is meant that the microwave oven should distribute the microwaves as uniform as possible such that "cold spots" are as few or as unlikely as possible. It is difficult to calculate the exact radiation distribution inside the oven as the objects to be treated and the amount of water and biological material varies. To estimate the radiation distribution in a microwave oven statistical methods are therefore used. A feasible probability distribution is the Chi-quadrat distribution, which expresses the sum of energy from n independent sources, where the parameter n is referred to as the number of degrees of freedom. A microwave oven may generate different standing waves of cold and warm zones inside the oven, these are called modes. Each mode supplies electromagnetic fields inside the microwave chamber in different positions. Different modes can be present at the same time or they may be shifted consecutively e.g. by using movable reflector or stirrer. Large industrial microwave ovens usually have a greater number of modes which increases the number of degrees of freedom, and gives more uniform microwave distribution in the oven. The number of degrees of freedom n can be estimated to:

$$n = 2\frac{E(P)^2}{VAR(P)}$$

Where P is the energy delivered to several places in the oven (e.g. measured by temperature sensors), and the expectation is E(P) and the variance is VAR(P). In an oven with 64 degrees of freedom it is 99.99% probable that the radiation intensity on a random position inside the oven is at least 47.5% of the average radiation intensity. It should however be understood that objects inside the microwave oven, including load carriers of plastic, will in varying degree affect the oven by absorbing energy and develop heat. Therefore the inventors performed tests by treating commercial load carriers (plastic trays, plastic pallets and plastic containers). It was found that microwave ovens with a hexagonal treatment chamber and a plurality of magnetrons were suitable for performing the microwave treatment according to the present invention, thereby achieving a killing rate of microorganisms of at least 99.99%. Microwave are a form of electromagnetic radiation with wavelengths ranging from about one meter to one millimeter, with frequencies between 300 MHz (1 m) and 300 GHz (1 mm). The microwave radiation used in microwave ovens usually have frequency of between 915 MHz to about 25 GHz. A standard microwave frequency suitable for the present microwave system is e.g. 2.45 GHz.

For logistical reasons, and to be able to treat large plastic items, the microwave oven for carrying out the present disinfection method should be a large industrial microwave oven, having a treatment chamber that can accommodate large load carriers/containers with dimensions as specified above. Such microwave ovens may be equipped with several magnetrons, which ensure a homogenous distribution of electromagnetic radiation in the treatment chamber. Examples of such ovens are microwave systems with 6-36 magnetrons, e.g. at least 8-16 magnetrons, each having e.g. an effect of 0.5-5 kW, e.g. 1-3 kW, the chamber may e.g. have a volume of 3-8 m$^3$. The treatment chamber may be designed as a rectangular box, hexagonal box, or any other suitable shape which allows a uniform distribution of electromagnetic radiation, while having capacity of accommodating a desired amount of plastic devices to be treated. It should be noted that microwave ovens suitable for carrying out the present method may be different from the said examples, and the skilled person should readily be able to choose suitable microwave systems adapted for the plastic objects that is to be treated. It should also be noted that in order to ensure sufficient distribution of microwaves in the treatment chamber, thereby achieving uniform heating of objects having different shapes and volumes, temperature sensors should be used to monitor the treatment of different objects, thereby finding suitable radiation intensity and treatment time for different objects. Tests performed by the inventors showed that microwave treatment time of less than 5-7 minutes was sufficient. Depending on the object to be disinfected, the treatment time may be as low as a few seconds, e.g. about 20 seconds, or about 30 seconds. Treatment of large plastic devices will generally be from about 1 minute to about 5 minutes. As stated above, treatment time and intensity (total effect from magnetrons) should be identified for different objects, to ensure sufficient heating time of all parts of the object, and to avoid overheating of any parts as such overheating may destroy the plastic devices. It is possible to identify suitable treatment time and microwave intensity, and possibly position in the treatment chamber, for different standard items, thereby by using recorded treatment requirements for the different items it is possible to treat the devices in a reliable and efficient way.

In a method for disinfecting a plastic conveyor band, the dismantled plastic parts should be washed according to conventional practice, and as described above using wash water that contains at least one electrolyte. The said plastic parts of the conveyor band may be washed by any suitable methods, either manually or automatic. The conveyor band may be washed by e.g. water jetting or flushing, while running, before being taken apart for microwave treatment. The plastic conveyor belt parts, wetted by the electrolyte solution, as described above, is thereafter transferred into the microwave oven, which may be of the same type as explained above, and subjected to microwave radiation in a sufficient time to achieve the desired rate of killing of the vegetative cells. Treatment time of less than 5 minutes will in most cases be sufficient to kill at least 99.99% of all microorganisms present on the plastic parts. It should be noted that in order to ensure suitable treatment time and intensity, temperatures sensors should be used to monitor the progress of the treatment thus ensuring that desired temperatures are achieved in a homogenous way, and without overheating any parts.

To carry out the disinfecting treatment of the plastic conveyor belt parts in a particularly efficient way, a plurality of wetted (by the electrolyte solution) conveyor belt parts may be placed in a load carrier/plastic container suitable for accommodating said parts, and that can withstand microwave radiation, the container may be of the type and of the material as described herein. This method for disinfecting the parts of the conveyor band results in a significantly amount of saved time compared to the traditional methods for sanitizing such conveyor bands, while at the same time achieving a very high degree of disinfection, meeting the goal of killing at least 99.99% of the microorganisms (vegetative cells). The present method efficiently disinfects all parts of a conveyor belt, including damaged parts, internal surfaces and hollow spaces, which might be difficult to sanitize using conventional washing and disinfection methods.

In an automated process to disinfect multiuse plastic devices, the plastic devises can be washed in a washing machine, where the wash solution is the electrolyte solution as described herein. After washing and rinsing the plastic object, still wetted by the electrolyte solution, especially in damaged areas, are directly transferred, e.g. by a transport band or rolling conveyor, into a microwave oven for treatment. The microwave oven may be equipped with two doors, thus after microwave treatment, the plastic device can be further moved by the transport band or rolling conveyor to a temporary storage, e.g. for repairing any damages on the plastic device.

In order to make the present invention more readily understood and show disinfection treatment effect of the present method, reference is made to the following examples, which are intended to be illustrative only and not intended to be limiting the scope.

The method according to the second aspect of the invention, to disinfect plastic trays used for screening at security checkpoints, is a simple, effective and reliable method of disinfecting such plastic trays. The method has a killing rate of at least 99.9%, such as 99.99%, and may even completely eliminate pathogenic microorganisms, including viruses, present on the plastic tray before the treatment. The present method is realized without usage of strong disinfectant and strong chemicals, and represents an environmental friendly method of disinfecting the plastic trays.

It should be understood that by "disinfecting" in this context, it is meant a method that kills/eliminates essentially all vegetative microorganisms, including viruses, initially present on the plastic tray. By "essentially all", it is meant by at least 99.9, or more advantageously at least 99.99% of vegetative microorganisms and viruses initially present on the plastic tray.

The term "pathogenic microorganism" as employed herein should be understood to include microorganisms that can produce disease. Pathogenic microorganism includes pathogenic bacteria, viral pathogens, pathogenic fungi, prionic pathogen, parasites and algal pathogen. Microorganism should be understood to also include viruses in the present context. Pathogenic bacteria in the present context refers principally to pathogenic vegetative bacteria.

In the present context the term "plastic tray" should be understood to denote any plastic tray, bin, box or container used for holding personal belonging for screening at security checkpoints. Such plastic trays are also commonly denoted "security trays". Plastic security trays come in different sizes, some examples of commercial security trays have sizes 530×360×110 mm; 550×390×140 mm; and 635×525× 110 mm. The plastic trays can typically be made of polyethylene materials, polypropylene material, or other suitable plastic material for such purposes, generally known in the art.

The present method of disinfecting plastic security trays used for screening at security checkpoints essentially includes the steps of contacting the plastic tray with an aqueous solution, and transferring the thus wetted plastic tray into a microwave generator in which the plastic device is subjected to microwave radiation treatment for a sufficient time to eliminate essentially all pathogenic microorganisms present on the plastic tray. The aqueous solution for wetting the plastic tray may be water, such as tap water, or the aqueous solution may comprise added electrolytes (ions). The present invention utilizes the fact that moist heat kills microorganisms more effectively than dry heat. As microwaves penetrate through plastic material without significantly heating the plastic material, water or liquid containing areas, also in damaged areas inside the plastic tray, will be rapidly heated, thus any microorganisms are killed. Ions (electrolytes) in the aqueous solution increases the heating rate during microwave treatment significantly, therefore even small droplets will be heated fast enough to kill the microorganisms before the droplets evaporate. In addition, the number of microorganisms being killed increases due to increasing osmolarity of the electrolyte aqueous solution as the water is evaporating. The aqueous solution may also comprise a foaming agent which aids the disinfection process by bubble formation during the microwave treatment, thus expanding the heated solution to colder areas, and thereby efficiently and quickly increasing the areas being treated.

Before the microwave treatment of the plastic tray, the tray is contacted with an aqueous solution, which may comprise (a) dissolved salt(s) and/or (b) diluted alkali or diluted acid, and/or (c) a foaming agent. If the plastic tray is soiled it should be washed, e.g. by using the said aqueous solution. The washing may be performed by manual methods using e.g. brushes, rinsing and/or pressure washer or by automatic methods, e.g. an industrial washing machine. Examples of suitable salts dissolved in the aqueous solution are NaCl, KCl, $Na_2SO_4$, $MgCl_2$, $Na_2HPO_4$, $NaH_2PO_4$, $K_2HPO_4$, $KH_2PO_4$, or a mixture thereof. Said salts are non-toxic and any salt left behind on the plastic tray after evaporation will not be harmful. The concentration of dissolved salt in water, forming an aqueous electrolyte solution, may be from about 0.5% to about 5.0% (5 g/L to 50 g/L), e.g. from about 1% to 3.5% (10 g/L to 35 g/L.

Alkali (bases) may kill microorganisms in itself when the concentration is relatively high, however if alkali is present in the aqueous solution according to the present method, it should be in a very dilute concentration. Suitable alkalis are NaOH, KOH, or mixtures thereof. During the microwave treatment, as water evaporates, the concentration of the alkali increases, thereby the killing effect of microorganisms increases. Concentration of alkali in the aqueous solution may be from about 0.1% to about 2% by weight. Effective killing of microorganisms and a fast heating rate during microwave treatment may be achieved with concentration of alkali between about 0.4% and about 1.5% by weight in the aqueous solution. It is however desired to reduce the usage of chemicals; therefore the concentration of alkali, if present, should advantageously be in the lower area, e.g. about 0.2% to about 0.5% by weight.

Instead of an alkali, an acid may be used. Suitable acids are e.g. hydrochloric acid (HCl) and phosphorus acid ($H_3PO_4$). Correspondingly as the alkali, acid may kill microorganisms in itself at relatively high concentration. If acid is present in the aqueous solution, it should be in a very dilute concentration. During the microwave treatment as the water evaporates the acid concentration increases which increases the microorganism killing effect. Concentration of acid in the aqueous solution, forming an electrolyte solution, should be from about 0.1% to about 2% by weight, e.g. from about 0.4% to about 1.5% by weight. Due to the desire of reduced usage of chemicals, the concentration of acid, if present, should be about 0.2% to about 0.5% by weight. As the water evaporates the concentration of the acid or alkali increases to a level that leads to killing of microorganisms, which may be important in very small droplets.

The aqueous solution may also comprise at least one foaming agent, i.e. bubble/froth forming substance. The foaming agent may be a soap. The amount of said foaming agent can be according to recommended amounts indicated by the soap producer. Advantageously the amount of foaming agent is in the lower recommended range, to reduce the amount of any remaining foaming agent on the plastic tray surface after disinfection treatment. Presence of a froth forming agent in the aqueous solution may have positive effect during the disinfecting treatment in the microwave oven, since bubbles are produced during the microwave treatment as the water starts boiling. The froth expands the volume of aqueous solution present on the plastic surface, so that heat is moved over larger areas. The aqueous solution may be water, water comprising at least one foaming agent, water comprising at least a foaming agent together with electrolyte(s) from (a) dissolved salt(s) as specified above, and/or (b) diluted alkali or diluted acid, as specified above, or water comprising (a) dissolved salt(s) as specified above, and/or (b) diluted alkali or diluted acid, as specified above.

Hence, the aqueous solution suitable for washing/wetting the plastic tray and microwave treatment does not contain any strong sanitizing and/or disinfecting chemicals that require additional precautions regarding handling, storage of use. The present aqueous solution does not contain harmful substances, such as oxidizing chemicals or disinfectants, which may put the workers and/or the environment at risk.

After washing and rinsing the plastic security tray, the plastic tray is treated by microwave radiation. As indicated above, the plastic tray should still be wet after the washing/wetting, thus having a film of the aqueous solution on the surface, before the treatment in the microwave chamber. The wet plastic security tray is subjected to microwave radiation for a sufficient amount of time to disinfect all parts of the surface. Heating by microwaves radiation kill microorganisms by heating in the same way as conventional heat treatment. The rate of killing is a function of time and temperature. The difference is that by using microwave radiation, the heating occurs much faster compared to conventional heating means, and primarily in the water phase, both on the outer surface and the inside of the plastic tray, in case of any damaged areas. Total energy consumption is therefore significantly lower than for conventional heating. There is, however, a risk that when using microwaves for heating, temperature gradients over relatively short distances may be created, and microorganisms can survive in cold and dry spots on the plastic tray. Consequently, quick heating rate and uniform distribution of microwaves for sufficient heating is important to achieve satisfactory results. This implies the recommended method to disinfect wet plastic trays immediately after washing/wetting and by using a microwave system that provides a homogenous microwave field in the treatment chamber.

The microwave-heated system for performing the present disinfecting method should thus generate a homogeneous microwave field. By a homogenous microwave field, it is meant that the microwave oven should distribute the microwaves as uniform as possible such that "cold spots" are as few or as unlikely as possible. It may be challenging to calculate the exact radiation distribution inside a microwave oven as the objects to be treated and the amount of water and biological material varies. To estimate the radiation distribution in a microwave oven, statistical methods are therefore used. A feasible probability distribution is the Chi-quadrat distribution, which expresses the sum of energy from n independent sources, where the parameter n is referred to as the number of degrees of freedom. A microwave oven may generate different standing waves of cold and warm zones inside the oven, these are called modes. Each mode supplies electromagnetic fields inside the microwave chamber in different positions. Different modes can be present at the same time or they may be shifted consecutively e.g. by using movable reflector or stirrer. Large industrial microwave ovens usually have a greater number of modes which increases the number of degrees of freedom and gives more uniform microwave distribution in the oven. The number of degrees of freedom n can be estimated to:

$$n = 2\frac{E(P)^2}{VAR(P)}$$

Where P is the energy delivered to several places in the oven (e.g. measured by temperature sensors), and the expectation is E(P) and the variance is VAR(P). In an oven with 64 degrees of freedom it is 99.99% probable that the radiation intensity on a random position inside the oven is at least 47.5% of the average radiation intensity. It should however be understood that objects inside the microwave oven will in varying degree affect the oven by absorbing energy and develop heat. Microwave ovens with a hexagonal treatment chamber and/or a plurality of magnetrons are especially suitable for performing the microwave treatment according to the present invention, because such system give a very uniform distribution of radiation intensity. It should be noted that the microwave chamber may have other shape than hexagonal, such as a rectangular shape, pentagonal or square shape. Microwave are a form of electromagnetic radiation with wavelengths ranging from about one meter to one millimeter, with frequencies between 300 MHz (1 m) and 300 GHz (1 mm). The microwave radiation used in microwave ovens usually have frequency of between 915 MHz to about 25 GHz. A standard microwave frequency suitable for the present microwave system is e.g. 2.45 GHz.

For logistical reasons, and to be able to treat relatively large plastic security trays, possibly more than one, or a plurality, simultaneously, the microwave oven for carrying out the present disinfection method can be a large industrial microwave oven, having a treatment chamber that can accommodate large plastic security trays, or a plurality of trays, with dimensions as specified above. Such microwave ovens may be equipped with several magnetrons, which ensure a homogenous distribution of electromagnetic radiation in the treatment chamber. Examples of such ovens are microwave systems with 6-36 magnetrons, e.g. 6-24, or 6-12 magnetrons, each having e.g. an effect of 0.5-5 kW, e.g. 1-3 kW. The treatment chamber may have a volume of about 0.15-3 $m^3$. The treatment chamber may be designed as a rectangular box, hexagonal box, square box, or any other suitable shape which allows a uniform distribution of electromagnetic radiation, while having capacity of accommodating a desired number of plastic trays to be treated. If several plastic trays are treated simultaneously, such as 10-30 trays, these should conveniently be placed e.g. on a rack system. It should be noted that microwave ovens suitable for carrying out the present method may vary in dimensions and effects, and the skilled person should readily be able to choose suitable microwave systems adapted for the size and amounts of plastic security trays that is to be treated. It should also be noted that in order to ensure sufficient distribution of microwaves in the treatment chamber, thereby achieving uniform heating of plastic trays having different sizes and volumes, temperature sensors may be used to monitor the treatment of different sizes of security trays, thereby finding suitable radiation intensity and treatment time.

Tests performed by the inventors showed that microwave treatment time for a plastic security tray can be less than 30 seconds, e.g. less than 25 seconds. Depending on the size of the plastic tray to be disinfected, the treatment time may be about 7-20 seconds, e.g. 10-20 seconds. Treatment of more than one plastic tray simultaneously will generally involve longer treatment time compared to treatment of only one plastic tray, since the total amount of water that needs to be heated is greater when a larger number of trays are treated at the same time. The treatment time of several trays (e.g. 20-30 trays) at the same time may therefore be about 1-3 minutes. However, the treatment time for each plastic security trays will be small, probably less than 10 seconds for each plastic tray when several are treated at the same time. As stated above, treatment time and intensity (total effect from magnetrons) can be identified for different sizes and number of security trays, to ensure sufficient heating time of all parts of the tray, and to avoid overheating of any parts as such overheating may destroy the plastic trays. It is possible to identify suitable treatment time and microwave intensity, and possibly position in the treatment chamber, for different standard tray sizes, thereby by using recorded treatment requirements for the different security trays it is possible to treat the trays in a reliable and efficient way.

In an automated or semi-automated process to disinfect plastic security trays, the plastic trays can be transported, e.g. on a conveyor line to a first zone, where the plastic security tray is wetted with the aqueous solution, e.g. in a washing machine, by rinsing, by spraying or dipping. After wetting the plastic tray, and while still wet, the plastic trays are directly transferred, e.g. by a conveyor line, into a microwave chamber for treatment with microwave radiation. The microwave chamber may be equipped with gates (e.g. sliding or hinged doors) at one or both ends, thus after microwave treatment, the disinfected plastic device can be further moved by the conveyor line to a collection point of the security trays, or directly returned to the security checkpoint for use. As described above, several plastic trays can be treated in the microwave chamber at the same time. In a practical method this may involve a first zone where the trays are wetted by the aqueous solution, the wetted trays may be placed on a rack and transferred into the microwave chamber for treatment. Another automated or semi-automated process may involve use of machine of robots handling and transferring the plastic trays between zones.

The following is a basis for estimating the killing rate of microorganisms (vegetative bacteria): if it is assumed that 99.5% of the water on a plastic security tray is present as volumes of 0.5 ml or more, and that in these volumes 99.999% of all microorganisms are killed during the microwave treatment while the remaining water volume is distributed in the form of small drops (0.05-0.5 ml) with 98% killing of the bacteria, the proportion of bacteria that survive the treatment can be calculated as:

$$100\% \cdot (N_0 \cdot 0.995 \cdot 0.00001 + N_0 \cdot 0.005 \cdot 0.02)/ N_0 = 0.00099\% + 0.01\% = 0.01099\% \approx 0.01\%$$

$N_0$=number of living cell before treatment. This corresponds to a killing of 99.99% as the target of the present method.

The present method for disinfecting plastic security trays by the usage of an aqueous solution in combination with microwave radiation is quick and reliable, and ensures that plastic security trays, that are handled by a large number of people, may not become a source of spreading diseases. The method according to the present invention also considerably reduces, and may even eliminate, the usage of strong sanitizing and/or disinfecting agents and chemicals, which is an important advantage since it is an increasing problem that microorganisms develop resistance to disinfectants and antiseptic agents. Since the problem of resistance bacteria is expected to increase in the future it is extremely important to develop disinfection methods that reduces and even avoids the usage of disinfecting chemicals. Attention is also directed to avoid spreading of resistant bacteria and microorganisms, which is especially a risk at security checkpoints at airport where travelers may bring pathogenic microorganisms to several locations. The method for disinfecting by the usage of microwave radiation, according to the present invention, involves a very short treatment time in a microwave oven, thus overheating and hot spots in the plastic trays are avoided. Short treatment time is also important for logistic reasons.

The present method of disinfecting plastic security trays may be used for disinfecting plastic trays which are used in screening at any type of security checkpoints, e.g. at airports, cruise ship boarding, train stations, and buildings (such as offices, museums, tourist attractions, courthouse, schools and governmental buildings, etc.) with security checkpoints.

EXAMPLES

Determination of Disinfection Effect on Load Carriers

Indicator bacterial cells (*Enterococcus faecium* NCIMB 2699) were grown in 50 ml GBB medium in culture flasks. The cells were harvested, centrifuged (3220×g, 15 min., 20° C.) and washed once with KPS-buffer, before resuspension in ¹/₁₀ of original culture volume in pure water or KPS-buffer and transferred to sterile plastic reagent tubes with screw cap.

Growth Medium and Dilution Buffer:

GBB-medium (per liter): Glucose $H_2O$, 1.1 g; $K_2HPO_4$, 3.68 g; $KH_2PO_4$, 1.32 g; Lab Lemco powder, 1.0 g; Peptone, 5.0 g; yeast extract, 2.0 g; NaCl, 5.0 g; RO-water, 1000 ml, pH=7.2.

KPS-buffer (per liter): $K_2HPO_4$, 0.87 g; $KH_2PO_4$, 0.68 NaCl, 9.0 g; RO-water, 1000 ml, pH=7.2.

The germ number in the samples was determined as most probably number (MPN) in a 96 well plate-based method. The sample was diluted in a tenfold dilution series in KPS-buffer, and from each relevant dilution 5×0.1 ml sample was transferred to 5 wells containing 0.1 ml double concentration GBB-medium (all components added in double concentration) on the 96 well plate. The well plate was packed in plastic and incubated overnight at 37° C. Wells with visible growth (turbidity and cell sediment) were registered as positive and most probable germ number was determined from tables arranged by Robert Blodgett (s.a) and available at US Food and Drug Adm. (BAM Appendix 2: Most Probable Number from Serial Dilutions, October 2010, url: www.fda.gov/Food/FoodScienceResearch/LaboratoryMethods/ucm109656.htm).

The tests were carried out on load carriers with approximate external dimensions (h×b×l) 100 cm×80 cm×80 cm, total inner volume about 330 L. Holes were drilled to different depths at several places in walls and bottom of load carriers, and vials with bacterial suspension (volumes from 15-400 µl) were placed in the drilled holes. The microwave system used in the experiment was a microwave oven with a hexagonal chamber and equipped with 36 magnetrons, thus ensuring a very homogeneous dispersion of microwaves inside the oven. The microwave oven was equipped with infrared camera to monitor the heat generation during the treatment of the load carriers. The oven was also equipped with fiber optic sensors for logging of temperatures in different places in and on the load carrier and in bacterial suspensions during the treatment. In this way, the heating of various fluids in the microwave as a function of location and different liquid volumes was tested. During treatment, the temperature in the bacterial suspensions and load carriers was measured and the degree of killing of the indicator bacteria was determined as a reduction in germ numbers, table I and table II. The bacterial suspensions in table I were suspended in pure water while the bacterial suspensions in table II were suspended in KPS-buffer. In addition, a detergent ADDI SU 930 was added to some vials in table I and table II. ADDI SU 930 (producer Lilleborg AS) is a strong alkaline detergent for foam and high pressure cleaning in the food industry comprising 10-30% NaOH, 1-5% ethanol, 1-5% alkyl-glucoside, 1-5% di-methyl-amine-oxide.

TABLE I

Test results where the bacteria were suspended in pure water. Samples where the goal of 99.99% killing was achieved is highlighted.

| Sample no. | Susp. volume (μl) | Germ number after treatment (MPN/ml) | Approximate 95% confidence interval (MPN/ml) | Survival (%) | Other observations |
|---|---|---|---|---|---|
| B 1 | 400 | $5.1 \cdot 10^7$ | $(1.7\text{-}12.0) \cdot 10^7$ | 0.6 | — |
| B 2 | 400 | $2.8 \cdot 10^6$ | $(1.0\text{-}6.9) \cdot 10^7$ | 0.4 | — |
| B 3 | 400 | $9.9 \cdot 10^7$ | $(3.0\text{-}30.0) \cdot 10^7$ | 1.2 | — |
| B 4 | 135 | $5.9 \cdot 10^8$ | $(1.6\text{-}16.3) \cdot 10^8$ | 7.3 | — |
| B 5 | 135 | $2.6 \cdot 10^{10}$ | $(0.7\text{-}8.1) \cdot 10^{10}$ | 324 | — |
| B 6 | 135 | $3.6 \cdot 10^8$ | $(1.1\text{-}11.1) \cdot 10^8$ | 4.5 | — |
| B 7 | 45 | $7.3 \cdot 10^9$ | $(2.2\text{-}22.2) \cdot 10^9$ | 92 | — |
| B 8 | 45 | $7.3 \cdot 10^9$ | $(2.2\text{-}22.2) \cdot 10^9$ | 92 | Ampoule almost dry after treatment |
| B 9 | 45 | $3.8 \cdot 10^8$ | $(1.3\text{-}8.9) \cdot 10^8$ | 4.7 | Ampoule almost dry after treatment |
| B 10 | 15 | $1.1 \cdot 10^{10}$ | $(0.3\text{-}3.1) \cdot 10^{10}$ | 133 | Ampoule almost dry after treatment |
| B 11 | 15 | $1.1 \cdot 10^{10}$ | $(0.3\text{-}3.1) \cdot 10^{10}$ | 133 | Ampoule almost dry after treatment |
| B 12 | 15 | $3.6 \cdot 10^9$ | $(1.0\text{-}11.3) \cdot 10^9$ | 45 | Ampoule dry after treatment |
| BV 13[A] | 45 | $<3 \cdot 10^1$ | — | <0.00001 | Ampoule dry after treatment |
| BV 14[A] | 45 | $2.2 \cdot 10^4$ | $(0.7\text{-}4.4) \cdot 10^4$ | 0.006 | — |
| B 15[B] | 45 | $4.9 \cdot 10^9$ | $(1.6\text{-}9.8) \cdot 10^9$ | 61 | Ampoule almost dry after treatment |

[A]An additional 45 μl wash solution (1.5% ADDI SU 930) was added to the ampoule.
[B]A long ampoule (4.5 ml total volume) to ensure that the sample was deep into the thickest part of the load carrier.

TABLE II

Test results where the bacteria were suspended in KPS-buffer. Samples where the goal of 99.99% killing was achieved is highlighted.

| Sample no. | Susp. volume (μl) | Germ number after treatment (MPN/ml) | Approximate 95% confidence interval (MPN/ml) | Survival (%) | Other observations |
|---|---|---|---|---|---|
| B 1 | 400 | $2.0 \cdot 10^4$ | $(0.5\text{-}5.5) \cdot 10^4$ | 0.0002 | Ampoule dry after treatment |
| B 2 | 400 | $8.5 \cdot 10^3$ | $(3.5\text{-}25.0) \cdot 10^3$ | 0.0001 | Ampoule dry after treatment |
| B 3 | 400 | $2.8 \cdot 10^3$ | $(0.9\text{-}6.5) \cdot 10^3$ | 0.00003 | Ampoule dry after treatment |
| B 4 | 135 | $<2.2 \cdot 10^3$ | — | <0.00003 | Ampoule dry after treatment |
| B 5 | 135 | $9.6 \cdot 10^3$ | $(3\text{-}26) \cdot 10^3$ | 0.0001 | Ampoule dry after treatment |
| B 6 | 135 | $2.4 \cdot 10^4$ | $(0.7\text{-}7.4) \cdot 10^4$ | 0.0003 | Ampoule dry after treatment |
| B 7 | 45 | $2.9 \cdot 10^7$ | $(0.8\text{-}8.9) \cdot 10^7$ | 0.4 | Ampoule almost dry after treatment |
| B 8 | 45 | $5.1 \cdot 10^7$ | $(1.5\text{-}16) \cdot 10^7$ | 0.6 | Ampoule almost dry after treatment |
| B 9 | 45 | $1.1 \cdot 10^8$ | $(0.3\text{-}3.3) \cdot 10^8$ | 1.4 | Ampoule almost dry after treatment |
| B 10 | 15 | $1.5 \cdot 10^8$ | $(0.5\text{-}47) \cdot 10^8$ | 1.9 | Ampoule dry after treatment |
| B 11 | 15 | $2.2 \cdot 10^8$ | $(0.7\text{-}67) \cdot 10^8$ | 2.8 | Ampoule dry after treatment |
| B 12 | 15 | $7.3 \cdot 10^8$ | $(2.3\text{-}16.7) \cdot 10^8$ | 9.2 | Ampoule dry after treatment |
| BV 13[A] | 45 | $5.1 \cdot 10^3$ | $(1.5\text{-}15.6) \cdot 10^3$ | 0.00006 | Ampoule dry after treatment |
| BV 14[A] | 45 | $5.1 \cdot 10^3$ | $(1.5\text{-}15.6) \cdot 10^3$ | 0.00006 | Ampoule dry after treatment |
| B 15[B] | 45 | $1.8 \cdot 10^8$ | $(0.5\text{-}4.9) \cdot 10^8$ | 2.2 | Ampoule almost dry after treatment |

[A]An additional 45 μl wash solution (1.5% ADDI SU 930) was added to the ampoule.
[B]A long ampoule (4.5 ml total volume) to ensure that the sample was deep into the thickest part of the load carrier.

The results show that small volumes and cells suspended in pure water increased bacterial survival rate (see Table I and Table II). However, the presence of the alkaline detergent ADDI SU 930 resulted in a greatly increased bacterial killing. An interesting and highly unexpected observation was that the presence of ions from dissolved salt in the water (KPS-buffer) promotes killing of bacteria, see Sample No. B1-B6 in Table II.

Experiments in laboratory scale and industrial plant showed that the killing of the indicator organism *E. faecium* NCIMB 2699 was dependent on the volume of fluid the bacteria were suspended in and the ionic content in the fluid. At very small volumes (<100 μl) the killing was less effective, and especially if the bacteria were suspended in clean water. In practice, however, it is expected that most of the water in and on a load carrier after washing and cleaning will be present in larger water collections in the damaged areas, rather than small water droplets (a drop of water is typically about 50 microliter). It is also reasonable to expect that the number of bacteria per water collection will be somewhat proportional to the volume of liquid. Thus, the overall killing rate for a large load carrier will be strongly affected by the distribution between small and large water volumes.

The following is a basis for estimating the killing rate: if it is assumed that 99.5% of the water in and on a load carrier is present as volumes of 0.5 ml or more, and that in these volumes 99.999% of all vegetative bacteria are killed during the microwave treatment (see results in Table II) while the remaining water volume is distributed in the form of small drops (0.05-0.5 ml) with 98% killing of the bacteria, the proportion of bacteria that survive the treatment can be calculated as:

$$100\% \cdot (N_0 \cdot 0.995 \cdot 0.00001 + N_0 \cdot 0.005 \cdot 0.02)/$$
$$N_0 = 0.00099\% + 0.01\% = 0.01099\% \approx 0.01\%$$

$N_0$=number of living cell before treatment. This corresponds to a killing of 99.99% as the target of the present method.

By the method described herein, it is thus provided a method that can be used for disinfecting multiuse plastic devices, including large multiuse plastic devices, which are prone to damages on the surface or internal parts, wherein potentially photogenic bacteria may grow. The present method may be used for treating said multiuse plastic devices before repairing any damaged parts. The present method may also be part of a hygiene routine in a food processing facility, hence ensuring a clean and sanitized production line for the food processing, thereby minimizing the risk of infecting and spreading harmful bacteria to food product.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

What is claimed is:

1. A method for disinfecting a multiuse plastic device used in food industry, in which harmful vegetative microorganisms may grow, comprising:
    contacting and/or washing the plastic device with an electrolyte solution comprising one or more of (a) dissolved salt and/or (b) an alkali or an acid, such that the plastic device is wetted, wherein the multiuse plastic device is selected from double walled load carriers, containers with an inner volume of 8 to 2,000 liters, and conveyor belts and wherein the multiuse plastic device includes damaged parts, internal surfaces, and hollow spaces that are insufficiently sterilized by the electrolyte solution and contain entrapped water; and
    transferring the thus wetted plastic device into a microwave oven treatment chamber, in which the plastic device and the entrapped water are subjected to microwave radiation treatment in a sufficient time to eliminate essentially all vegetative microorganisms present on and in the plastic device;
    wherein the microwave radiation treatment time is less than about 7 minutes; and
    wherein the microwave radiation is formed by 6-36 magnetrons, each having an effect of 0.5-5 kW.

2. The method according to claim 1, wherein the electrolyte solution further comprises (c) a bubble forming agent.

3. The method according to claim 1, wherein the microwave treatment is from about 30 seconds to about 5 minutes.

4. The method according to claim 1, wherein the electrolyte solution is formed by at least one dissolved salt selected from the group consisting of NaCl, KCl, $Na_2SO_4$, $MgCl_2$, $Na_2HPO_4$, $NaH_2PO_4$, $K_2HPO_4$, $KH_2PO_4$, seawater, and a mixture thereof.

5. The method according to claim 4, wherein the amount of dissolved salt(s) is from about 5 g/L to about 50 g/L.

6. The method according to claim 1, wherein the alkali is NaOH and/or KOH.

7. The method according to claim 1, wherein the acid is HCl or $H_3PO_4$.

8. The method according to claim 1, wherein the electrolyte solution contacts the plastic device by spraying, brushing, pressure washer or immersing.

9. The method according to claim 1, wherein the microwave radiation treatment is performed in a microwave oven which has a uniform electromagnetic radiation throughout the treatment chamber.

10. The method according to claim 1, wherein the multiuse plastic device comprises load carriers, containers, pallets, boxes, trays, shovels, or conveyor belts.

11. The method according to claim 1, wherein the multiuse plastic devices have damage(s) in the surface or internal parts, in which there is an increased risk of growth of microorganisms.

12. The method according to claim 1, wherein at least 99.99% of vegetative microorganisms initially present on and/or in the plastic device are killed.

13. The method according to claim 1, further comprising expanding the electrolyte solution, heated by the microwave radiation treatment, to colder areas of the plastic device with a foaming agent.

14. A method for disinfecting a conveyor belt used in food industry, in which harmful vegetative microorganisms may grow, comprising:
    demounting of the conveyor belt,
    washing and/or contacting the conveyor belt parts with an electrolyte solution comprising one or more of (a) dissolved salt and/or (b) an alkali or an acid, and
    placing the thus wetted conveyor belt parts in a plastic container and transferring the container, containing the conveyor belt parts, into a microwave oven, in which the conveyor belt parts are subjected to microwave radiation treatment in a sufficient time to eliminate essentially all vegetative microorganisms present on the conveyor belt parts.

* * * * *